United States Patent
Li et al.

(10) Patent No.: US 8,171,163 B2
(45) Date of Patent: *May 1, 2012

(54) METHOD FOR TRACKING TRANSMISSION STATUS OF DATA TO ENTITIES SUCH AS PEERS IN A NETWORK

(75) Inventors: Anthony J. Li, Los Altos, CA (US); Rex Emmanuel Fernando, San Jose, CA (US); Henk H. W. Smit, Groesbeek (NL); Hasmit S. Grover, Fremont, CA (US); Avneesh Sachdev, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/089,118

(22) Filed: Apr. 18, 2011

(65) Prior Publication Data

US 2011/0196985 A1 Aug. 11, 2011

Related U.S. Application Data

(63) Continuation of application No. 10/748,343, filed on Dec. 29, 2003, now Pat. No. 7,930,426, which is a continuation of application No. 10/405,146, filed on Apr. 1, 2003, now abandoned.

(51) Int. Cl.
*G06F 13/00* (2006.01)
(52) U.S. Cl. .................. 709/242; 709/224; 709/230
(58) Field of Classification Search .................. 709/223, 709/224, 230, 238, 242
See application file for complete search history.

(56) References Cited

U.S. PATENT DOCUMENTS

| | | | |
|---|---|---|---|
| 5,390,328 A | 2/1995 | Frey et al. | |
| 5,666,523 A | 9/1997 | D'Souza | |
| 5,966,380 A * | 10/1999 | Przygienda | 370/389 |
| 6,088,707 A | 7/2000 | Bates et al. | |
| 6,108,771 A | 8/2000 | Gaertner et al. | |
| 6,182,286 B1 | 1/2001 | Sigal et al. | |
| 6,236,993 B1 | 5/2001 | Fanberg | |
| 6,301,710 B1 | 10/2001 | Fujiwara | |
| 6,425,126 B1 | 7/2002 | Branson et al. | |
| 6,505,347 B1 | 1/2003 | Kaneko et al. | |
| 6,574,194 B1 * | 6/2003 | Sun et al. | 370/235 |
| 6,701,393 B1 | 3/2004 | Kemeny et al. | |

(Continued)

OTHER PUBLICATIONS

U.S. Appl. No. 10/748,343, Non-Final Office Action mailed Aug. 2, 2007, 17 pgs.

(Continued)

*Primary Examiner* — Viet Vu
(74) *Attorney, Agent, or Firm* — Schwegman, Lundberg & Woessner, P.A.

(57) ABSTRACT

A method for tracking a transmission status of one or more data elements to one or more devices. In one example, the method includes providing a list including one or more devices and one or more data elements; processing the list to determine a data element of the one or more data elements to transmit to a device of one of the one or more devices; and upon successfully transmitting the data element to the device, adjusting the list so that the list indicates that the device has received the transmitted data element. In this manner, the status of whether a particular data element has been sent to a particular device can be easily derived from the list.

20 Claims, 11 Drawing Sheets

U.S. PATENT DOCUMENTS

| | | |
|---|---|---|
| 6,738,932 B1 | 5/2004 | Price |
| 6,785,277 B1 | 8/2004 | Sundling et al. |
| 6,941,308 B1 | 9/2005 | Chilton |
| 6,980,548 B1 | 12/2005 | Zaccone et al. |
| 7,180,887 B1 | 2/2007 | Schwaderer et al. |
| 7,366,208 B2 | 4/2008 | Bowes |
| 7,643,481 B2 | 1/2010 | Kadambi et al. |
| 7,894,365 B2 | 2/2011 | Li et al. |
| 2002/0037035 A1 | 3/2002 | Singh |
| 2003/0005233 A1 | 1/2003 | Stewart et al. |
| 2003/0161287 A1* | 8/2003 | Venkitaraman et al. ...... 370/338 |
| 2004/0003374 A1 | 1/2004 | Van De Vanter et al. |
| 2004/0006704 A1 | 1/2004 | Dahlstrom et al. |
| 2004/0122864 A1 | 6/2004 | Silagi et al. |
| 2006/0041509 A1 | 2/2006 | Koerber |
| 2006/0161737 A1 | 7/2006 | Martin et al. |
| 2006/0173885 A1 | 8/2006 | Moir et al. |
| 2009/0097489 A1 | 4/2009 | Li et al. |

OTHER PUBLICATIONS

U.S. Appl. No. 10/748,343, Response filed Nov. 28, 2007 to Non-Final Office Action mailed Aug. 2, 2007, 11 pgs.

U.S. Appl. No. 10/748,343, Final Office Action mailed Feb. 20, 2008, 22 pgs.

U.S. Appl. No. 10/748,343, Response filed May 20, 2008 to Final Office Action mailed Feb. 20, 2008, 12 pgs.

U.S. Appl. No. 10/748,343, Notice of Allowance mailed Jun. 12, 2008, 10 pgs.

U.S. Appl. No. 10/748,343, Non-Final Office Action mailed Aug. 18, 2010, 6 pgs.

U.S. Appl. No. 10/748,343, Response file Nov. 15, 2010 to Non-Final Office Action mailed Aug. 15, 2010, 9 pgs.

U.S. Appl. No. 10/748,843, Notice of Allowance mailed Dec. 8, 2010, 4 pgs.

U.S. Appl. No. 12/243,721, Non-Final Office Action mailed Jun. 24, 2010, 22 pgs.

U.S. Appl. No. 12/243,721, Preliminary Amendment filed Oct. 1, 2008, 8 pgs.

U.S. Appl. No. 12/243,721, Response filed Aug. 5, 2010 to Non Final Office Action mailed Jun. 24, 2010, 12 pgs.

U.S. Appl. No. 12/243,721, Notice of Allowance mailed Oct. 19, 2010, 6 pgs.

US 7,769,816, 08/2010, Li et al. (withdrawn)

* cited by examiner

METHOD FOR TRACKING TRANSMISSION STATUS OF DATA TO ENTITIES SUCH AS PEERS IN A NETWORK

CLAIM OF PRIORITY

This application is a continuation of and claims the benefit of priority under 35 U.S.C. §120 to U.S. patent application Ser. No. 10/748,343, entitled "METHOD FOR TRACKING TRANSMISSION STATUS OF DATA TO ENTITIES SUCH AS PEERS IN A NETWORK," filed on Dec. 29, 2003, now U.S. Pat. No. 7,930,426, issued on Apr. 19, 2011, which is a continuation of and claims the benefit of priority under 35 U.S.C. §120 to U.S. patent application Ser. No. 10/405,146, entitled "METHOD FOR TRACKING TRANSMISSION STATUS OF DATA TO ENTITIES SUCH AS PEERS IN A NETWORK," filed on Apr. 1, 2003, now abandoned, each of which are hereby incorporated by reference herein in their entirety.

TECHNICAL FIELD

This application relates, in general, to routers, and more particularly to methods for tracking a transmission status of data to be communicated to entities such as peers in a network.

BACKGROUND

Typically, routers have a route processor which communicates with other routers in a network to obtain updates of route information regarding the network. A route processor maintains a routing table which contains a large number of entries or elements for use by the router to determine how to forward packets that are received by the router. Conventional routing tables may contain hundreds of thousands of routing entries or elements, and as a greater number of devices such as personal data assistants (PDAs), cell phones, and other devices are assigned IP addresses, the number of entries in routing tables is expected to grow substantially over the coming years.

In the Internet, a routing protocol known as Border Gateway Protocol (BGP) provides a way for routers to share routing information with other routers throughout the network. These other routers that a router speaks to are called "BGP peers." FIG. 1 illustrates an example of a BGP speaking router 20 in communications with three BGP peers (routers) 22, 24, 26 shown as Peer 1, Peer 2 and Peer 3 in this example. As the router 20 learns new routing information, it may need to communicate this new information to one or more of its peers 22, 24, 26.

FIG. 2 shows one method to track a transmission status of data elements 30, such as routing entries (shown as I1 to I4), with respect to peers 32 (i.e., which peers need to be updated with particular data elements). In FIG. 2, data elements I1-I4 are shown as column headers, and Peers 1-3 are shown as row headers. Such a table data structure 34 can be used in a router to track which peers need to be updated with what data elements. For example in FIG. 2, data elements I1 and I4 need to be communicated to Peer 1, data elements I2 and I4 need to be communicated to Peer 2, and data elements I1 and I4 need to be communicated to Peer 3, in this example.

As recognized by the present inventors, such a table data structure 34 to track the status of data elements 30 as shown in FIG. 2 is undesirable because it requires large amounts of memory to form this data structure. This is particularly true where the number of data elements 30 may be on the order of hundreds of thousands of routing entries or data elements, such as in the case of route entries in a routing table of a router which are to be communicated to numerous peers in the network.

As recognized by the present inventors, what is needed is a method for tracking the state or transmission status of data elements with respect to peers or other devices or other entities in a network.

It is against this background that various embodiments of the present invention were developed.

SUMMARY OF THE INVENTION

In light of the above and according to one broad aspect of one embodiment of the present invention, disclosed herein is a method for tracking a transmission status of one or more data elements or routing entries to one or more devices. In one example, the method includes providing a list including one or more devices and one or more data elements; processing the list to determine a data element of the one or more data elements to transmit to a device of one of the one or more devices; and upon successfully transmitting the data element to the device, adjusting the list so that the list indicates that the device has received the transmitted data element. In this manner, the status of whether a particular data element has been sent to a particular device can be derived from the list.

The methods described herein are particularly useful in the context of network routers, where the number of data elements in a routing table of a router may be substantial. In one embodiment, the list may be implemented as a linked list, wherein data elements or devices may be added or deleted from the list. The list may also include a global version number, a local version number associated with each data element in the list, and a local version number associated with each device in the list. The local version number associated with a data element in the list may be set to a value of the global version number at a time when the data element was added to the list. The local version number associated with a device in the list may be set to an initial value of zero and may be reset to the local version number of a data element after the data element is successfully transmitted to the device.

Processing the list may include the operations of locating a device in the list which is nearest to a start of the list; obtaining the version number for the device; and comparing the version number to the global version number to determine if the device should have a data element transmitted to the device. If the version number of the device is not equal to the global version number, then in one example the device should have a data element transmitted to the device.

In one embodiment, the operation of adjusting the list includes repositioning the device within the list adjacent to the data element and closer to an end of the list than the data element and resetting the local version number of the device to be equal to the local version number of the data element transmitted to the device.

According to another broad aspect of another embodiment of the invention, disclosed herein is a method for transmitting one or more data elements to one or more devices. In one example, the method includes providing a list including one or more devices and one or more data elements; processing the list to determine a data element of the one or more data elements to transmit to a device of one of the one or more devices; transmitting the data element to the device; and adjusting the list to indicate that the device has received the transmitted data element.

According to another broad aspect of another embodiment of the present invention, disclosed herein is a router. In one example, the router include a module for providing a list including one or more devices and one or more data elements; a module for processing the list to determine a data element of the one or more data elements to transmit to a device of one of the one or more devices; a module for transmitting the data element to the device; and a module for adjusting the list so that the list indicates that the device has received the transmitted data element.

Various embodiments of the present invention may be embodied as computer program products including computer usable medium and computer readable code embodied on the computer usable medium, the computer readable code including computer readable program code devices configured to cause the computer to perform or effect one or more of the operations described herein.

The features, utilities and advantages of various embodiments of the invention will be apparent from the following more particular description of embodiments of the invention as illustrated in the accompanying drawings.

DETAILED DESCRIPTION

Figures 1, 2:
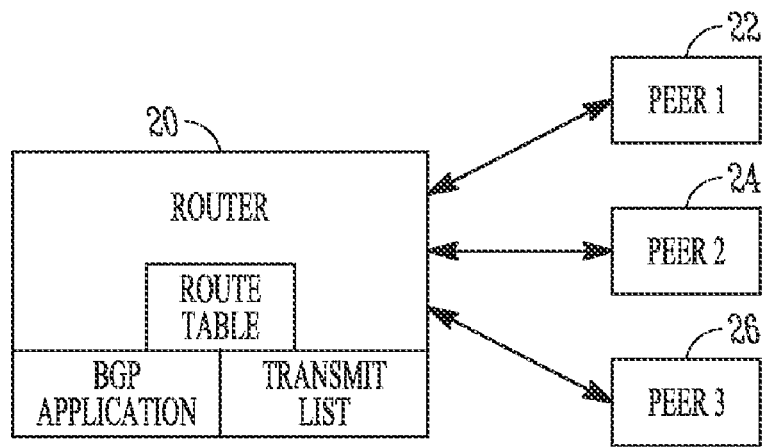
FIG. 1 illustrates a block diagram of a router communicating with a plurality of peers.
FIG. 2 illustrates an example a table data structure for tracking a transmission status of data elements with respect to peers or other devices or other entities in a network.

According to one broad aspect of one embodiment of the present invention, disclosed herein is a method and a data structure for tracking the transmission status of a plurality of data elements or routing entries to a plurality of intended receivers, devices, modules, peers or entities, referred to as members. The methods and data structures described herein are particularly useful in the context of network routers such as shown in FIG. 1, where the number of data elements or routing entries in a routing table of a router may be substantial. In the router of FIG. 1, a transmission list, described below, provides information to a BGP application program running in the router so that the router updates its peer members with new route information or other data as needed. In one example, the transmission list of an embodiment of the present invention is used to track the state of which peer members have received certain data elements. One or more steps of the methods disclosed herein can be used to transfer large routing databases between routers in a network. Various embodiments of the present invention will now be described.

Figure 3:
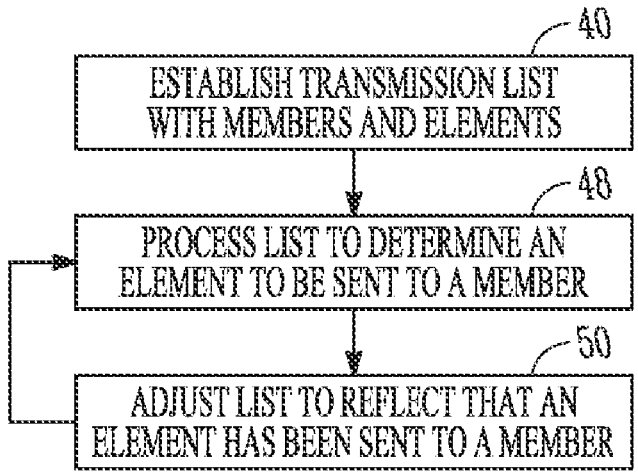
FIG. 3 illustrates an example of logical operations for forming a transmission list for tracking the transmission status of data elements with respect to peers or other devices or other entities in a network, in accordance with one embodiment of the present invention.
Figure 4:
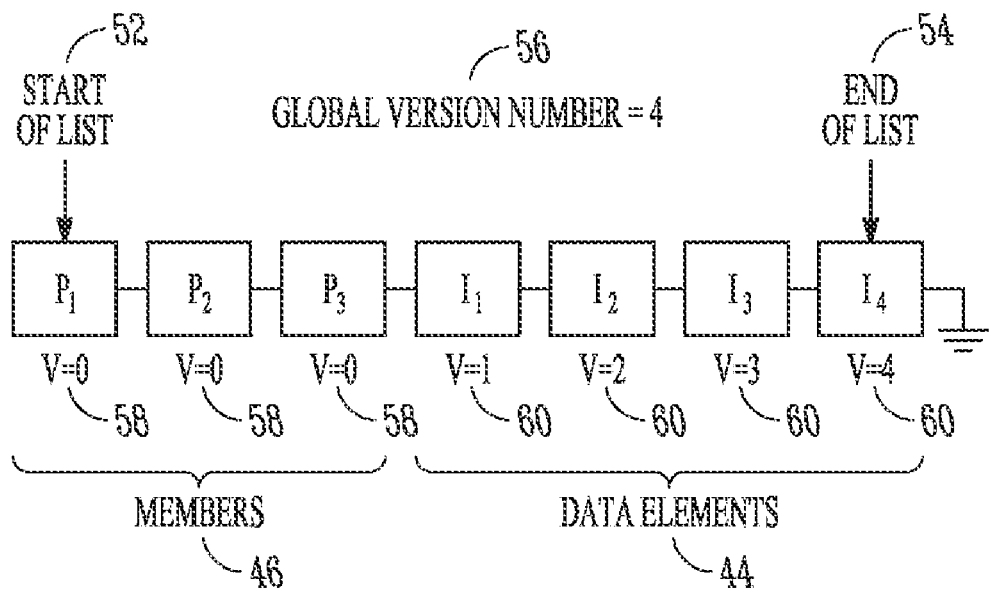
FIG. 4 illustrates an example of a transmission list, in accordance with one embodiment of the present invention.

Referring to FIG. 3, FIG. 3 illustrates an example of logical operations for tracking a transmission status of the plurality of data elements (i.e., routing entries) with regard to a plurality of members (i.e., intended receivers, devices, modules, peers, entities, etc.). At operation 40, a list is established with the members and data elements. In one embodiment, the list is implemented as a linked list wherein a plurality of data elements and members are linked together within the list, and the relative positions of the members and elements within the list are used to derive transmission status or state information. An example of such a linked list 42 is illustrated in FIG. 4, wherein data elements 44, shown as I1, I2, I3, I4 are in a linked list with members 46, shown as P1, P2, and P3, in this example. It is understood that while FIG. 4 illustrates only three members 46 and four data elements 44, the number of members 46 and data elements 44 in the list 42 could be substantially larger in order to accommodate, for instance, a large number of route entries in a routing table of a router.

At operation 48 of FIG. 3, the list is processed to determine what elements need to be sent to which members. For instance, a router can utilize the list to examine and quickly determine which particular data elements need to be sent to particular members. At operation 50, the list is adjusted to reflect when a particular member has been sent particular elements. In other words, when a member has been sent a data element, the transmission list is adjusted to reflect this fact. In one embodiment, operations 48-50 are implemented in a continuous loop which may be a background process running in a router. Various examples of transmission lists in accordance with the present invention will be described in greater detail below.

In one embodiment, a transmission list is maintained and may be implemented in the programming language of C as a data structure or linked list. As shown in FIG. 4, a transmission list 42 may include one or more members 46—which represent entities or routers which are to receive data—and one or more elements 44—which represent data elements, data values, routing entries or information to be transmitted to the one or more members 46. In one example, the members 46 and elements 44 are arranged in a linked list 42, wherein each item in the list references the item adjacent to it in the list. In one example, the links between elements or members in the transmission list are bi-directional.

The transmission list 42 can be used to maintain the state of transmission status of the one or more elements 44 to the one or more members 46. In one embodiment, if an element 44 is positioned closer to the end of the transmission list 42 than a member 46, such relative positioning indicates that the member 46 has not yet received the element 44. Hence, at an initial time prior to any transmissions, the members 46 would be located at the start of the list 42, and the data elements 44 would be positioned in the list 42 approximate the end of the list, as shown in FIG. 4.

Conversely, if a member 46 is positioned closer to the end of the transmission list 42 than a data element 44, then such positioning indicates that the member 46 has already received the element 44. Hence, at steady state when all members 46 have received all data elements 44, then all of the members 46 would be positioned within the list approximate the end of the transmission list, and all of the elements would be positioned within the list approximate the start of the transmission list.

As shown in FIG. 4, a pointer 52 may be maintained indicating the start or beginning of the transmission list, and another pointer 54 may be maintained indicating the end of the transmission list. Further, a global version number 56 may be maintained based on the elements in the list, and as elements are added to the list, the global version number 56 may be incremented. Each member 46 is provided with its own local version number 58 (abbreviated as "v" in FIG. 4) which, in one example, is initialized to zero at the time when the member 46 is added to the transmission list. Further, in one example, each element 44 may be provided with a local version number 60 (abbreviated as "v" in FIG. 4) which is initially set to a value of the global version number 56 when the element was added to the transmission list. In one example, when an element needs to be added to the list, the global version number is incremented and the element's version number is set to this incremented global version number. The element is then added to the end of the transmission list, in one example.

By utilizing a transmission list, flow control is provided in that the data elements 44 may be transmitted to members 46 in a graceful and ordered fashion. Embodiments of the present invention may be particularly beneficial in networking wherein the transmission list 42 may include hundreds of members 46—such as "peer" routers—and there may be hundreds of thousands of elements 44—such as routing information including route updates. By the use of a transmission list, the computing operations to determine the next data elements to be transmitted to the next member can be performed in constant time, as opposed to a matrix system of FIG. 2 which may be a time intensive search operation to locate such information. Further, in contrast to a system utilizing a matrix or table such as shown in FIG. 2, wherein the amount of transient memory utilized by such a data structure is approximately proportional to the number of members multiplied by the number of elements, the amount of memory utilized by a transmission list 42 in accordance with an embodiment of the invention is proportional to the number of members plus the number of elements multiplied by the amount of memory to maintain the linkage in the list, such as four bytes. Accordingly, as members 46 or elements 44 are added to the transmission list 42, the amount of memory utilized by a transmission list 42 would grow linearly, not by a multiplication factor.

A member list may also be maintained which includes all of the members 46 in the transmission list. By maintaining a member list separate from the transmission list 42, the members in the transmission list can be easily located, particularly where the members are amongst hundreds of thousands of elements in the transmission list.

Figure 5:
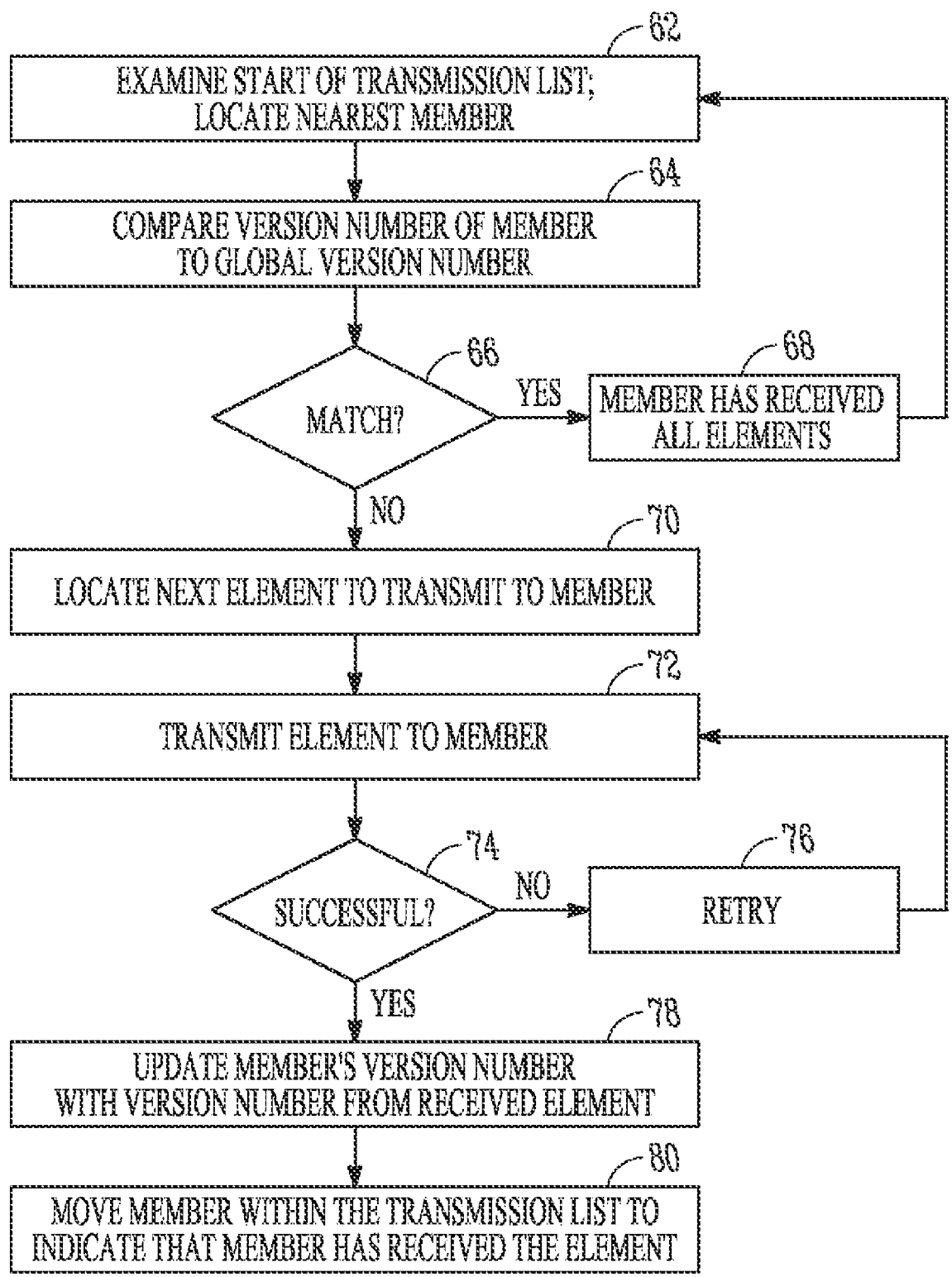
FIG. 5 illustrates an example of logical operations for transmitting elements to the members in a transmission list, in accordance with one example of the present invention.

FIG. 5 illustrates an example of logical operations for processing a transmission list to determine a next element to be transmitted to a member, in accordance with one embodiment of the present invention. Referring to FIG. 5, at operation 62, the start of the transmission list is examined and the nearest member is located, in one embodiment. In one example, the locate operation 62 may be performed using a radix search, a patricia tree search, a hash table search, a skip list search, a red-black tree search, or other look-up methodologies for locating an item in a data structure. Alternatively, locating a member may merely involve a walk of the linked list, and for flow control purposes, members could be skipped temporarily and other members selected that are ready for receiving routing information.

At operation 64, upon locating a member, the version number associated with the located member is compared with the global version number. Operation 66 determines if the member's version number matches the global version number, and if so, this indicates that this member has received all data elements (see block 68) and in one embodiment, control is returned to operation 62. In this instance, operations 62-66 will repeat until a new data element is added or modified such that operation 66 detects that the global version number and a member's version number do not match.

Assuming that a member's version number and the global version number do not match, then control is passed to operation 70. Operation 70 locates a next element in the transmission list to transmit to a member. In one embodiment, operation 70 locates the next element nearest to the start of the transmission list. In one example, the element that occurs in the linked list after the member, is the element to be sent to the member. The locate operation 70 may be performed using a non-key based search or using a radix search, a patricia tree search, a hash table search, a skip list search, a red-black tree search, or other look-up methodologies for locating an item in a data structure.

At operation 72, the element located by operation 70 is transmitted to a member, preferably the member located by operation 62. The transmission operation 72 may be a transmission of a message over a network to another device such as a peer, or may include transmitting or writing data to another process within a device. Operation 74 determines whether the transmission operation 72 was successful and if not, operation 76 retries the transmission operation. In one example, operation 74 awaits receipt of an acknowledgment response from the member to which the element was transmitted by operation 72, and when such acknowledgement is received, operation 74 passes control to operation 78.

At operation 78, assuming that the transmission operation 72 was successful, operation 78 updates the member's version number to be the same as the version number from the elements which was transmitted to the member. At operation 80, the member is moved within the transmission list to indicate that the member has received the element. In one example, operation 80 positions the member adjacent to the element such that the member is positioned closer to the end of transmission list than the position of the element.

Operation 80 may pass control to operation 62 such that these operations may be repeated as needed so that all data elements are transmitted to all members, and as data; elements are modified or added, or members are added, the operations of FIG. 5 ensure that the elements are transmitted to the appropriate members as needed.

The operations of FIG. 5 are beneficial in that they provide a graceful and controlled transmission of the data elements to the members, which is particularly beneficial in networking because some routers can only absorb a finite amount of information at any given time relating to route updates or other routing information.

Figure 6:
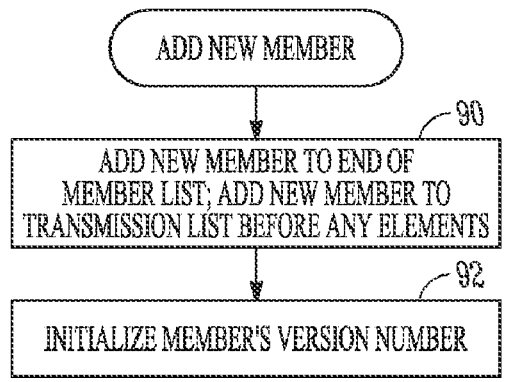
FIG. 6 illustrates an example of logical operations for adding a new member, in accordance with one embodiment of the present invention.

In accordance with embodiments of the present invention, new members can be added to or deleted from a transmission list, and new elements can be added, deleted, or modified. FIGS. 6-10 relate to these operations. In FIG. 6, when a new member is added, operation 90 adds the member to the end of the member list and, in one embodiment, the member is added into the transmission list approximate the start of the transmission list before any elements, which, in one example, may be at the start of the transmission list. At operation 92, the new member's version number is initialized, and in one example, is initially set to zero.

Figure 7:
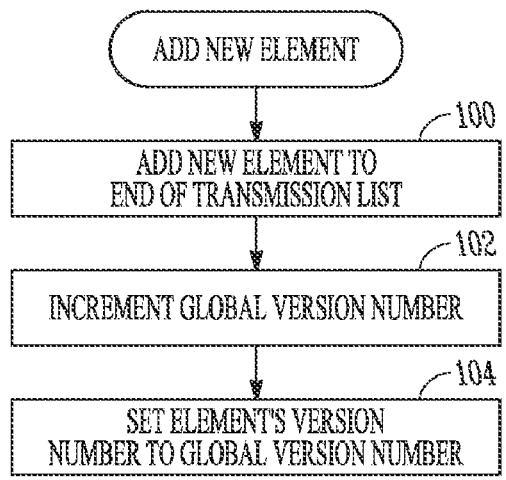
FIG. 7 illustrates an example of logical operations for adding a new element to a transmission list, in accordance with one embodiment of the present invention.

In FIG. 7, when a new element is added to the transmission list, operation 100 adds the new elements to the end of the transmission list. At operation 102, the global version number is incremented to reflect the fact that the new element has been added to the transmission list, and at operation 104, the version number of the element is set to be the value of the global version number.

Figure 8:
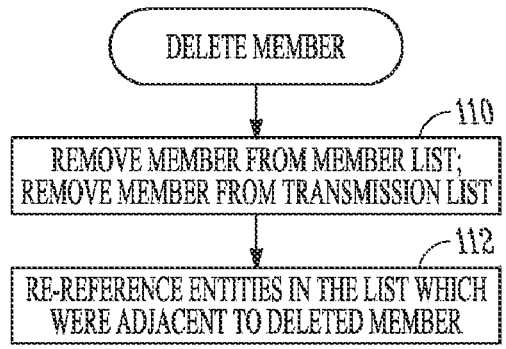
FIG. 8 illustrates an example of logical operations for deleting a member, in accordance with one embodiment of the present invention.

In FIG. 8, when a member is deleted, operation 110 removes the member from the member list and from the transmission list. The effect of operation 110 is that a void or disconnect is created in the member list and the transmission list, and operation 112 reconnects each of these lists such that the voids in the list are patched by referencing to one another the items which were adjacent to the removed member.

Figure 9:
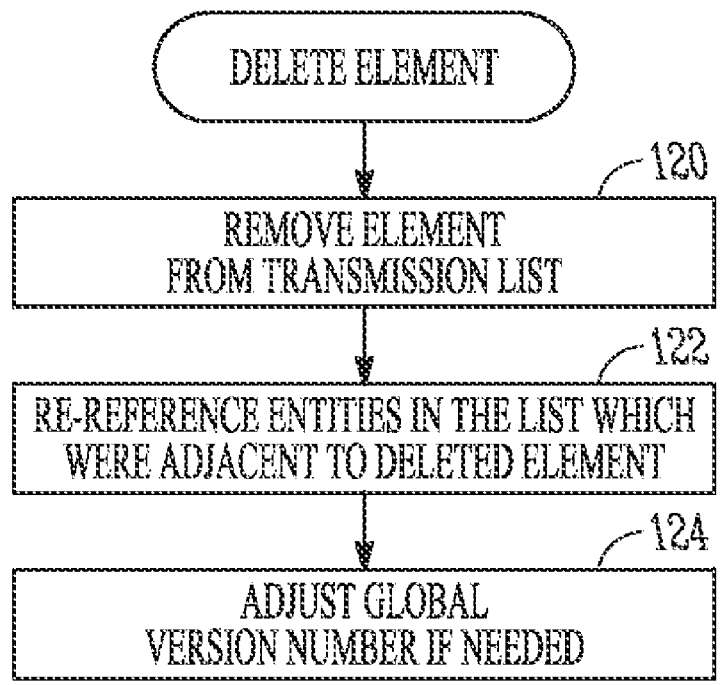
FIG. 9 illustrates an example of logical operations for deleting an element from a transmission list, in accordance with one embodiment of the present invention.

In FIG. 9, when an element is deleted from the transmission list, at operation 120, the element is removed from the transmission list, which creates a void in the list. Operation 122 reconnects the list by referencing to one another the items which were previously adjacent to the removed element. At operation 124, the global version number is adjusted to account for the fact that an element in the list has been deleted. For example, if the element deleted from the list was the highest numbered element in the list wherein the element's version number was equal to the global version number, then operation 124 would decrement the global version number upon deletion of that element. If the deleted element had a version number which was less than the global version number, then upon deletion of that element, the global version number would not need adjustment, in one example.

Figure 10:
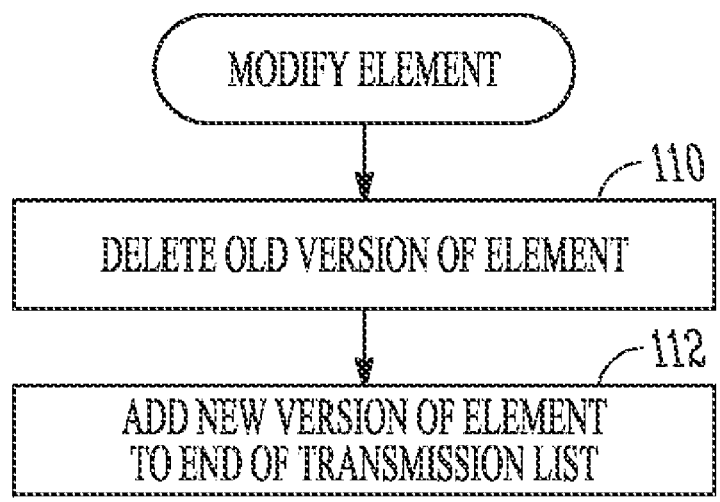
FIG. 10 illustrates an example of logical operations for modifying an element in a transmission list, in accordance with one embodiment of the present invention.

FIG. 10 illustrates an example of logical operations for modifying an element in a transmission list, in accordance with one embodiment of the present invention. A modification of a data element can be implemented as a deletion of the old version of the element and an addition of the new version of the element. At operation 130, the old version of the element is deleted. Operation 130 may be implemented using the operations of FIG. 9, in one example. At operation 132 of FIG. 10, the new version of the element is added to the end of the transmission list (which may be implemented using the operations of FIG. 7). The operations of FIG. 7 take care of incrementing the global version number.

Figure 11A:
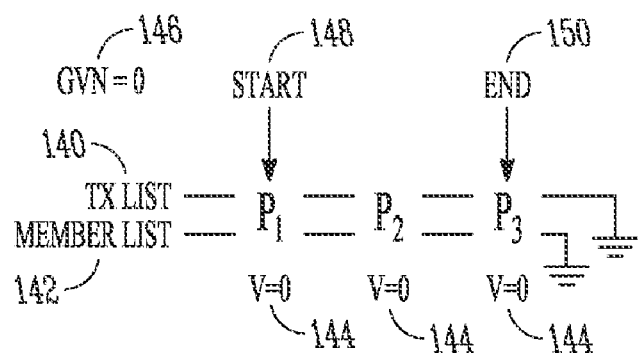
FIGS. 11A-11N illustrate examples of transmission lists changing over time as elements are added to the transmission lists, and as elements are transmitted to members, in accordance with one embodiment of the present invention.
Figure 11B:
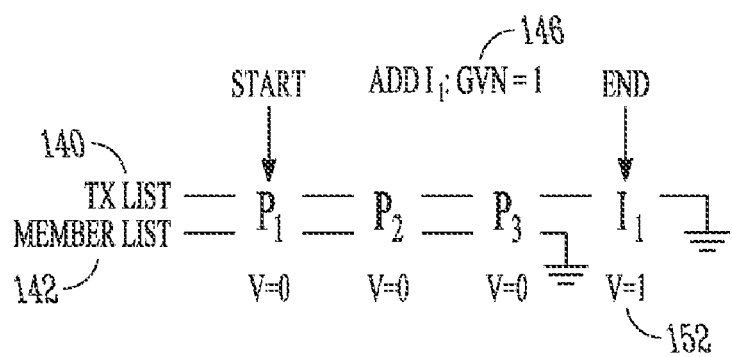
Figure 11C:
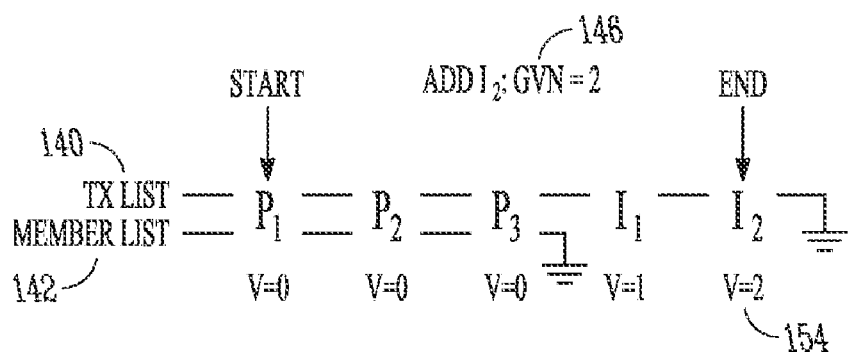
Figure 11D:
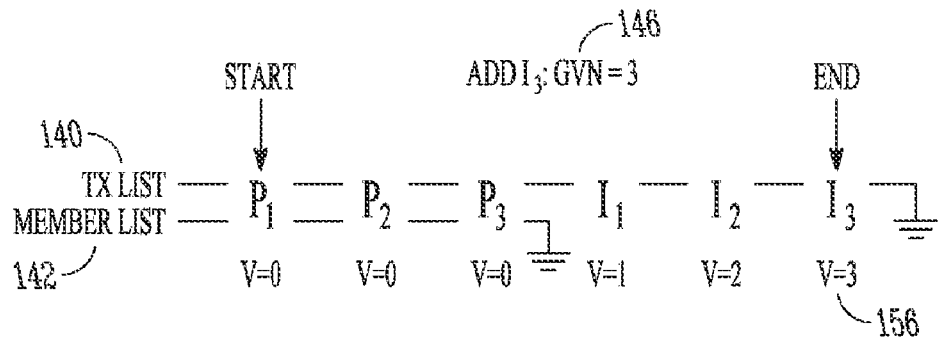
Figure 11E:
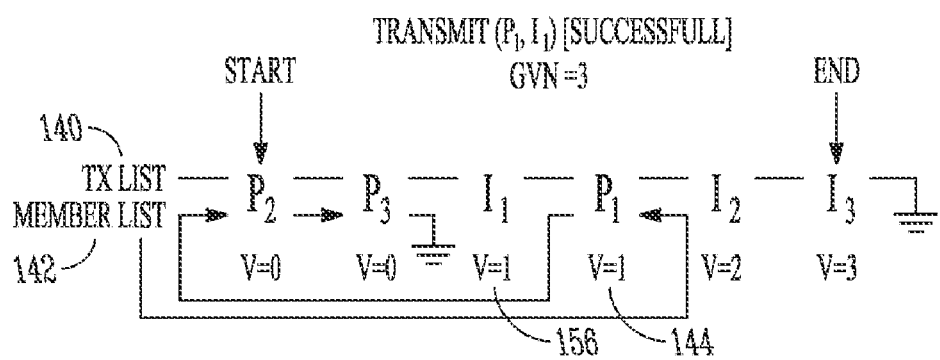
Figure 11F:
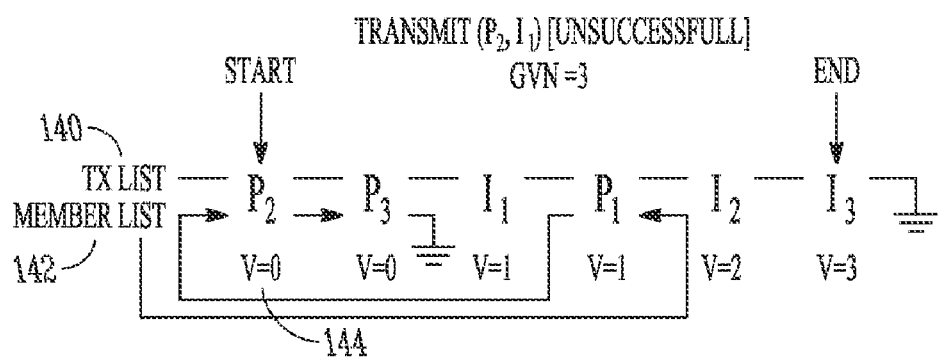
Figure 11G:
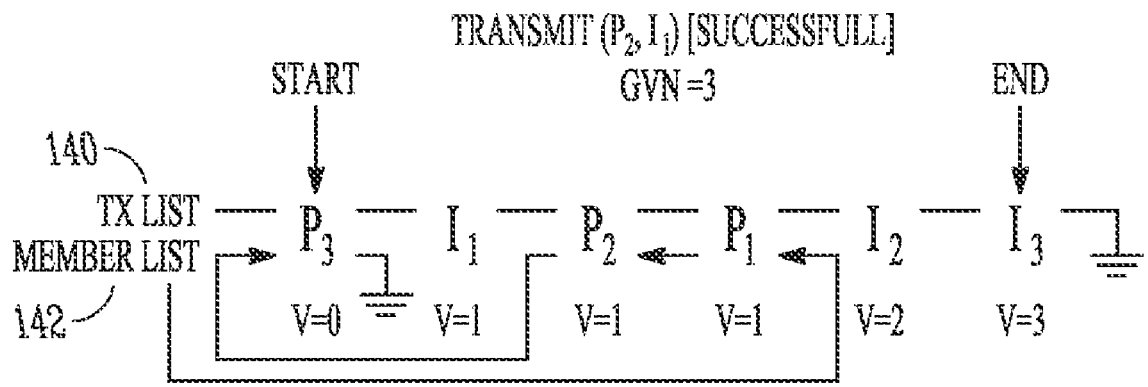
Figure 11H:
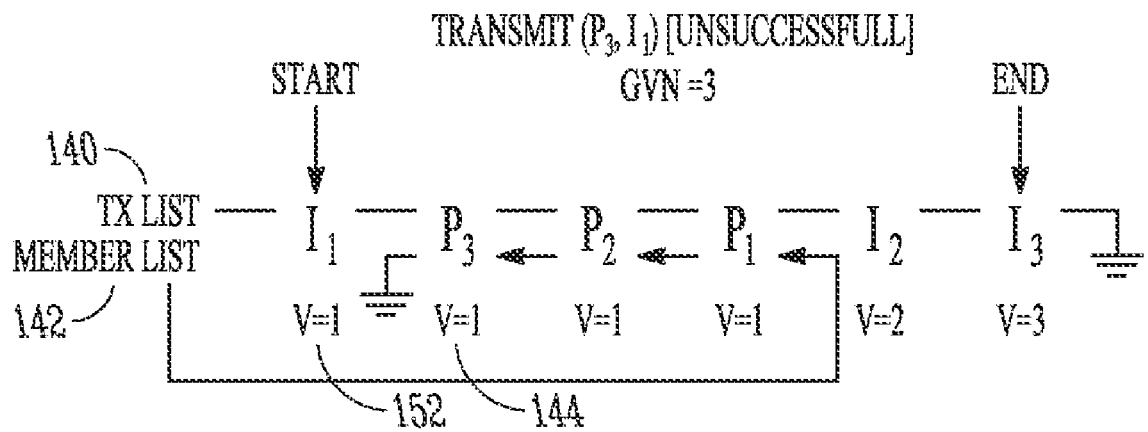
Figure 11I:
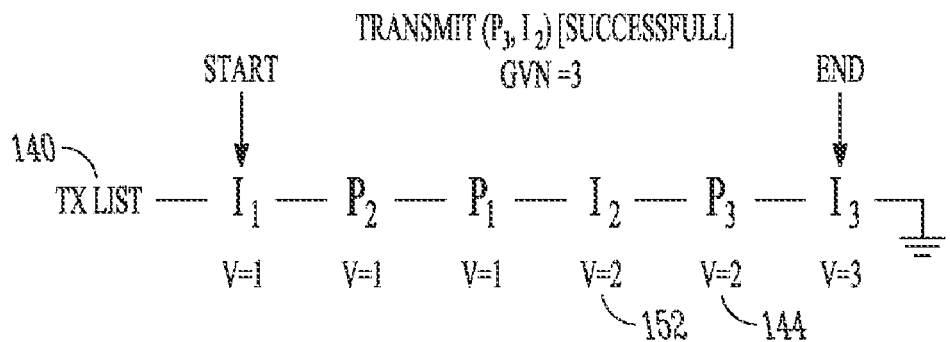
Figure 11J:
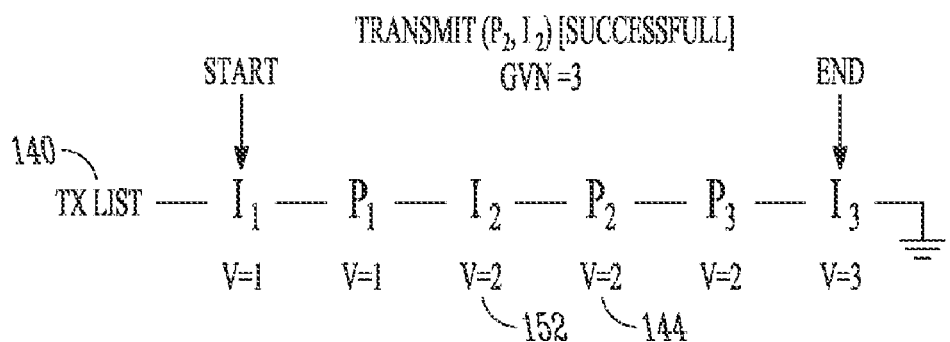
Figure 11K:
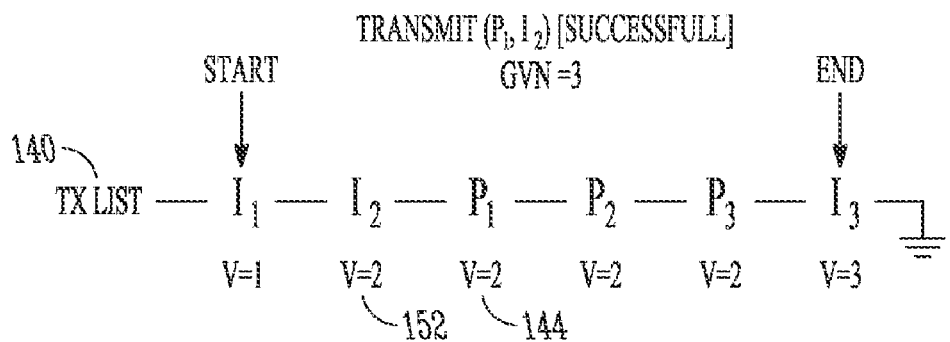
Figure 11L:
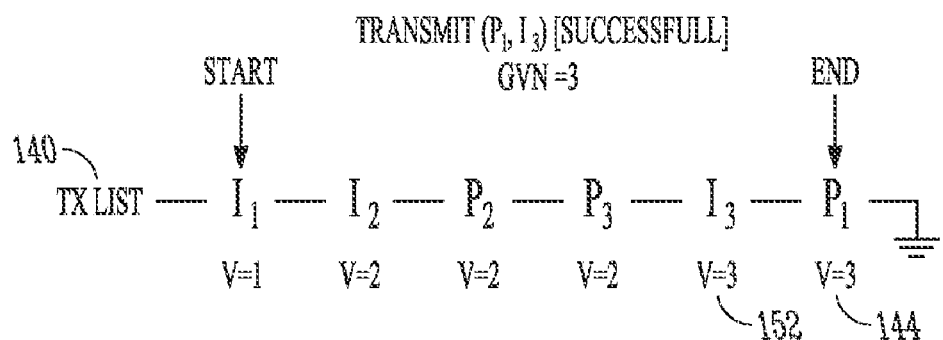
Figure 11M:
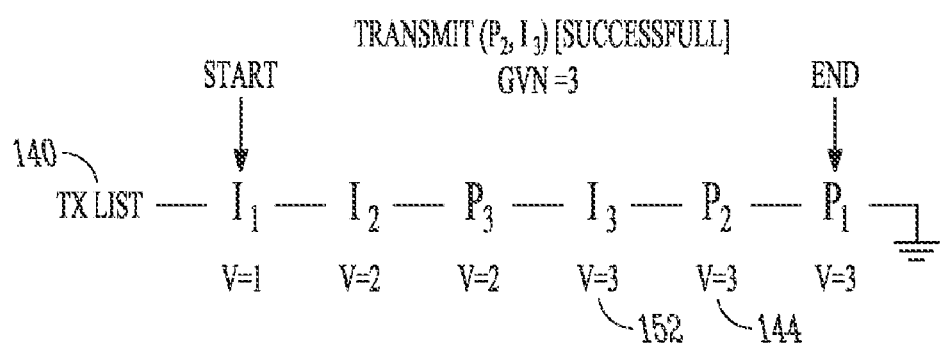
Figure 11N:
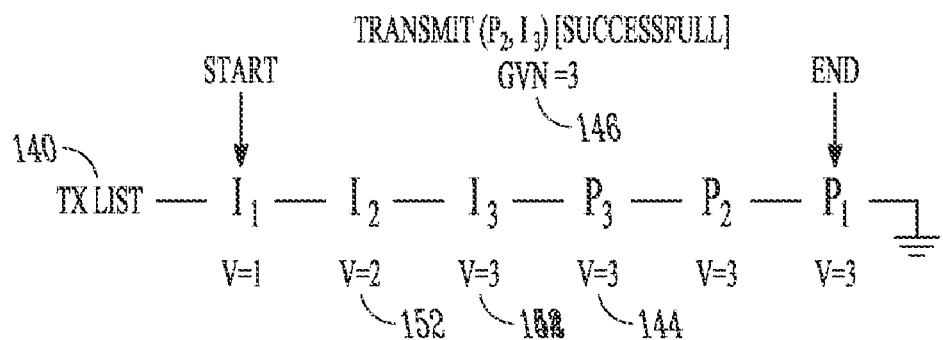

In FIGS. 11A-N, various examples of a transmission list 140 and a member list 142 are illustrated. In FIG. 11A, the transmission list 140 begins with three members P1, P2, and P3, each having local version numbers 144 initialized to zero (shown as v=0). The global version number 146 (shown as "GVN") is also initialized to zero. As indicated in FIG. 11A, a start pointer 148 points to member P1 and end pointer 150 points to member P3 of the transmission list. In FIG. 11B, an element I1 is added, and accordingly the global version number 146 is incremented to have a value of one and the element I1 is set to have a version number 152 equal to the global version number 146 of one. The element I1 is added to the transmission list at the end of the transmission list. In FIG. 11C, another element I2 is added to the end of the transmission list, and accordingly, the global version number 146 is incremented to a value of two and the version number 154 associated with the element I2 is also set to have a value equal to the global version number 146 of two. In FIG. 11D, another data element I3 is added to the end of the transmission list, and accordingly the global version number 146 is incremented to a value of three, and the version number 156 of the element I3 is set to the value of the global version number 146 of three.

In examining FIG. 11D, it can be seen that, pursuant to example operations of FIG. 5, the transmission list 140 indicates that element I1 should be transmitted to member P1, in one example. In FIG. 11E, assuming that the element I1 is successfully transmitted to member P1, then the member P1 is repositioned within the transmission list 140 adjacent to element I1 and closer to the end of the transmission list. Further, the version number 144 associated with member P1 is set to the value of the version number 156 of the element I1 which was successfully transmitted to member P1 (i.e. to a value of one in this example).

In examining FIG. 11E, the transmission list 140 indicates that element I1 is to be transmitted to member P2. In FIG. 11F, the data element I1 is attempted to be transmitted to member P2, however, assuming such attempted transmission was unsuccessful, then the position of member P2 relative to element I1 remains unchanged in the transmission list 140, in one embodiment. Assuming that the transmission of element I1 to member P2 is retried and successful, then as shown in FIG. 11G, member P2 is repositioned in the transmission list 140 adjacent to element I1 closer to the end of the transmission list, and member P2's version number 144 is updated.

In examining FIG. 11G, the transmission list 140 indicates that element I1 is to be transmitted to member P3. In FIG. 11H, assuming that the element I1 is successfully transmitted to member P3, then the member P3 is repositioned within the transmission list 140 adjacent to element I1 and closer to the end of the transmission list. Further, the version number 144 associated with member P3 is set to the value of the version number 152 of the element I1 which was successfully transmitted to member P3 (i.e. to a value of one in this example).

In examining FIG. 11H, the transmission list 140 indicates that element I2 is to be transmitted to member P3. In FIG. 11I, assuming that the element I2 is successfully transmitted to member P3, then the member P3 is repositioned within the transmission list 140 adjacent to element I2 and closer to the end of the transmission list. Further, the version number 144 associated with member P3 is set to the value of the version number 152 of the element I2 which was successfully transmitted to member P3 (i.e. to a value of two in this example). Note that in FIGS. 11I to 11N, the member list 142 shown in FIGS. 11A-H is not shown which simplifies the drawings.

In examining FIG. 11I, the transmission list 140 indicates that element I2 is to be transmitted to member P2. In FIG. 11J, assuming that the element I2 is successfully transmitted to member P2, then the member P2 is repositioned within the transmission list 140 adjacent to element I2 and closer to the end of the transmission list. Further, the version number 144 associated with member P2 is set to the value of the version number 152 of the element I2 which was successfully transmitted to member P2 (i.e. to a value of two in this example).

In examining FIG. 11J, the transmission list 142 indicates that element I2 is to be transmitted to member P1. In FIG. 11K, assuming that the element I2 is successfully transmitted to member P1, then the member P1 is repositioned within the transmission list 140 adjacent to element I2 and closer to the end of the transmission list. Further, the version number 144 associated with member P1 is set to the value of the version number 152 of the element I2 which was successfully transmitted to member P1 (i.e. to a value of two in this example).

In examining FIG. 11K, the transmission list 140 indicates that element I3 is to be transmitted to member P1. In FIG. 11L, assuming that the element I3 is successfully transmitted to member P1, then the member P1 is repositioned within the transmission list adjacent to element I3 and closer to the end of the transmission list. Further, the version number 144 associated with member P1 is set to the value of the version number 152 of the element I3 which was successfully transmitted to member P1 (i.e. to a value of three in this example).

In examining FIG. 11L, the transmission list 140 indicates that element I3 is to be transmitted to member P2. In FIG. 11M, assuming that the element I3 is successfully transmitted to member P2, then the member P2 is repositioned within the transmission list adjacent to element I3 and closer to the end of the transmission list. Further, the version number 144 associated with member P2 is set to the value of the version number of the element I3 which was successfully transmitted to member P2 (i.e. to a value of three in this example).

In examining FIG. 11M, the transmission list 140 indicates that element I3 is to be transmitted to member P3. In FIG. 11N, assuming that the element I3 is successfully transmitted to member P3, then the member P3 is repositioned within the transmission list adjacent to element I3 and closer to the end of the transmission list. Further, the version number 144 associated with member P3 is set to the value of the version number 152 of the element I3 which was successfully transmitted to member P3 (i.e. to a value of three in this example).

Because in FIG. 11N the version numbers 144 of the members is equal to the global version number 146, this condition indicates that all of the members have received all of the elements. Further, the positions of the members relative to the elements in the list also indicate that all of the members have received all of the elements. Accordingly, if can be seen that by maintaining a transmission list including members and elements, the transmission list tracks and indicates the status as elements are transmitted to members.

Figure 12A:
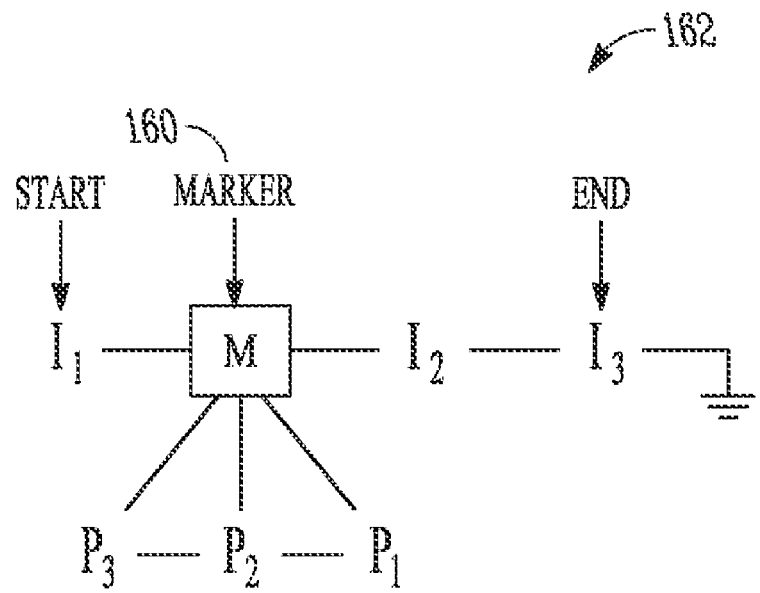
FIGS. 12A-12B illustrate an example of a use of a marker with a transmission list, in accordance with one embodiment of the present invention.
Figure 12B:
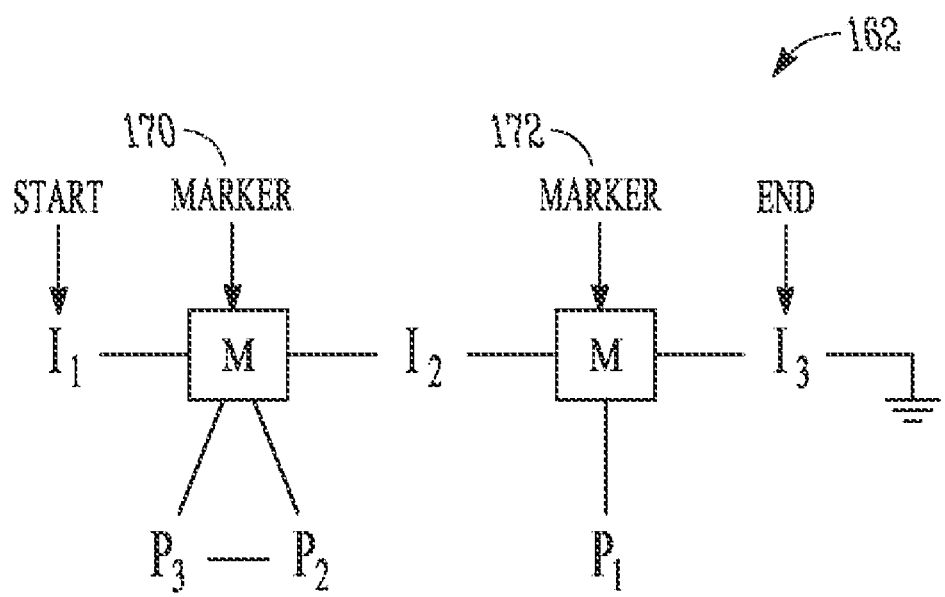

In another embodiment, one or more markers or indexes may be used with the transmission list to represent or point to the positions of members in the transmission list. In one example, the number of markers is less than or equal to the number of members in the list. In this manner, the markers eliminate the need to "walk down" the transmission list to find a member. For example, where a transmission list is lengthy and contains hundreds of thousands of items including members and elements, use of one or more markers permit operation 62 of FIG. 5 to instantaneously locate the nearest member in a lengthy transmission list. Examples of use of a marker are shown in FIGS. 12A and 12B, wherein in FIG. 12A a marker 160 is shown representing the location of members P1, P2, and P3 in the transmission list 162. In FIG. 12B, assuming that element I1 was sent to member P1, then a first marker 170 indicates the location of member P1 in the transmission list 162, while a second marker 172 indicates the location of members P2, P3 in the transmission list.

Assuming that there are 100 members and 100,000 elements, it can be seen that a table structure as shown in FIG. 2 would require an amount of memory proportional to (1 bit×100×100,000)=10,000,000 bits, whereas a system employing an embodiment of the present invention may use, in one example, an amount of memory proportional to (32 bits×(100+100,000))=3,203,200 bits, plus some small amount of memory for the pointers and/or markers and/or other list management values. Hence, in this example, the amount of memory used by embodiments of the present invention is substantially smaller and can be searched much more quickly than the system of FIG. 2. Furthermore, embodiments of the present invention require relatively less CPU cycles to determine the next element to be transmitted since this can be done in a constant time operation rather than an operation with a matrix model. If an embodiment of the present invention is employed within a router, the amount of memory savings and improvements in computational efficiency will be significant over the system of FIG. 2.

The methods disclosed herein can be used to transfer large routing databases between routing peers. While the examples shown and described herein include three members and three elements in a transmission list, it is understood that embodiments of the present invention may include multiple members and multiple elements, such that the transmission list may have hundreds of thousands, or more, of items therein. Also, it is understood that the example operations of FIG. 5 and the other figures herein could be altered to process items in the transmission list in a different manner, while still using the transmission list to indicate and track the status of members and elements in the list. The operations of FIG. 5 are by way of example only, and the variations in the operations—such as reversing the order of one or more of the operations, reversing the orientation of the transmission list, performing a hybrid process, and/or performing a complementary process—are within the scope the invention.

One or more operations described herein may be implemented as one or more modules, or portions thereof, in a router, for example as shown in FIG. 1. Furthermore, various embodiments of the present invention may be embodied as computer program products—such as removable media, disks, CD ROMS, or other computer program products—including computer usable medium and computer readable code embodied on the computer usable medium, the computer readable code including computer readable program code devices configured to cause the computer to perform or effect one or more of the operations described herein. Embodiments of the present invention may also be embodied in computer readable code which may be transmitted over a network as packet data, as a carrier wave, or as a propagated signal.

While the methods disclosed herein have been described and shown with reference to particular operations performed in a particular order, it will be understood that these operations may be combined, sub-divided, or re-ordered to form equivalent methods without departing from the teachings of the present invention. Accordingly, unless specifically indicated herein, the order and grouping of the operations is not a limitation of the present invention.

While the invention has been particularly shown and described with reference to various embodiments thereof, if will be understood by those skilled in the art that various other changes in the form and details may be made without departing from the spirit and scope of the invention.

What is claimed is:

1. A method comprising:
   maintaining a list including one or more routing device indicators for one or more respective routing devices and including one or more data element indicators for one or more respective data elements that are to be transmitted to the one or more routing devices, each data element including a routing entry in a routing table;
   processing the list to determine whether a particular data element of the one or more data elements is to be transmitted to a particular routing device of one of the one or more routing devices; and
   upon successfully transmitting the particular data element to the particular routing device, adjusting the list so that the list indicates that the particular routing device has received the particular data element.

2. The method of claim 1, wherein maintaining the list includes forming a linked list between the one or more data element indicators and the one or more routing device indicators.

3. The method of claim 1, wherein maintaining the list further comprises:

providing a global version number associated with the list;
providing a local version number associated with each of the one or more data element indicators in the list; and
providing a local version number associated with each of the one or more routing device indicators in the list.

4. The method of claim 3, further comprising, upon adding a new data element indicator to the list, setting the local version number associated with the new data element indicator to a value of an incremented global version number.

5. The method of claim 3, further comprising setting an initial value of zero for the one or more routing device indicators.

6. The method of claim 3, further comprising setting an initial value of zero for the local version number, and resetting the local version number associated with routing device indicator of the particular routing device to the local version number of the data element indicator of the particular data element after the particular data element is successfully transmitted to the particular routing device.

7. The method of claim 3, further comprising adding an indicator for a new data element to an end of the list, and incrementing the global version number.

8. The method of claim 7, further comprising adding an indicator for a new routing device to a start of the list.

9. The method of claim 3, wherein processing the list comprises:
   processing the list to determine a nearest routing device indicator, the nearest routing device indicator being the routing device indicator which is nearest to a start of the list;
   obtaining a version number for the nearest routing device indicator; and
   comparing the global version number to the version number for the nearest routing device indicator, to determine whether the particular data element is to be transmitted to the routing device corresponding to the nearest routing device indicator.

10. The method of claim 9, wherein comparing the global version number to the version number for the nearest routing device indicator comprises determining that the particular data element is to be transmitted to the device corresponding to the nearest routing device indicator if the version number of the nearest routing device indicator is not equal to the global version number.

11. The method of claim 3, wherein adjusting the list comprises repositioning the routing device indicator for the particular routing device within the list.

12. The method of claim 11, wherein the operation of adjusting the list further comprises resetting the local version number of routing device indicator for the particular routing device to be equal to the local version number of the data element indicator for the particular data element.

13. The method of claim 1, further comprising transmitting the particular data element to the particular routing device.

14. A router comprising:
   a module to maintain a list including one or more routing device indicators for one or more respective routing devices and including one or more data element indicators for one or more respective data elements, each data element including a routing entry in a routing table;
   a module to process the list to determine whether a particular data element of the one or more data elements is to be transmitted to a particular routing device of one of the one or more routing devices; and
   a module to adjust the list upon successfully transmitting the particular data element to the particular routing device, adjusting the list so that the list indicates that the particular routing device has received the particular data element.

15. The router of claim 14, wherein the module to maintain the list is configured further to:
   provide a global version number associated with the list;
   provide a local version number associated with each of the one or more data element indicators in the list; and
   provide a local version number associated with each of the one or more routing indicators in the list.

16. The router of claim 15, wherein the module to maintain the list is configured, upon adding a new data element indicator to the list, to set the local version number associated with the new data element indicator to a value of an incremented global version number.

17. The router of claim 15, wherein the module to maintain the list is configured to set an initial value of zero for the local version number, the module to adjust the list being configured to reset the local version number associated with routing device indicator for the particular routing device to the local version number of the data element indicator for the particular data element after the particular data element is successfully transmitted to the particular routing device.

18. The router of claim 15, wherein the module to process the list is configured to:
   process the list to determine a nearest routing device indicator, the nearest routing device indicator being the routing device indicator which is nearest to a start of the list;
   obtain a version number for the nearest routing device indicator; and
   compare the global version number to the version number for the nearest routing device indicator, to determine whether the particular data element is to be transmitted to the routing device cones to the nearest routing device indicator.

19. The router of claim 14, further comprising a module to transmit the particular data element to the particular routing device.

20. Logic encoded in one or more non-transitory, tangible media for execution by a machine, and, when executed, to cause the machine to:
   maintain a list including one or more routing device indicators for one or more respective routing devices and including one or more data element indicators for one or more respective data elements that are to be transmitted to the one or more routing devices, each data element including a routing entry in a routing table;
   process the list to determine whether a particular data element of the one or more data elements is to be transmitted to a particular routing device of one of the one or more routing devices; and
   upon successfully transmitting the particular data element to the particular routing device, adjust the list so that the list indicates that the particular routing device has received the particular data element.

* * * * *

UNITED STATES PATENT AND TRADEMARK OFFICE
CERTIFICATE OF CORRECTION

| | | |
|---|---|---|
| PATENT NO. | : 8,171,163 B2 | Page 1 of 1 |
| APPLICATION NO. | : 13/089118 | |
| DATED | : May 1, 2012 | |
| INVENTOR(S) | : Anthony J. Li et al. | |

It is certified that error appears in the above-identified patent and that said Letters Patent is hereby corrected as shown below:

In column 12, line 38, in Claim 18, delete "cones to" and insert -- corresponding to --, therefor.

Signed and Sealed this
Seventeenth Day of July, 2012

David J. Kappos
*Director of the United States Patent and Trademark Office*